(12) United States Patent
Song et al.

(10) Patent No.: US 9,652,024 B2
(45) Date of Patent: May 16, 2017

(54) MODE SWITCHING METHOD AND APPARATUS OF TERMINAL

(71) Applicant: Samsung Electronics Co., Ltd., Suwon-si, Gyeonggi-do (KR)

(72) Inventors: Seongwook Song, Seoul (KR); Sungyoon Cho, Seoul (KR); Jonghan Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 14/466,054

(22) Filed: Aug. 22, 2014

(65) Prior Publication Data

US 2015/0058649 A1  Feb. 26, 2015

Related U.S. Application Data

(60) Provisional application No. 61/869,247, filed on Aug. 23, 2013.

(30) Foreign Application Priority Data

Aug. 11, 2014 (KR) .................. 10-2014-0103785

(51) Int. Cl.
*G06F 1/32* (2006.01)
*G06F 3/01* (2006.01)

(52) U.S. Cl.
CPC .......... *G06F 1/3231* (2013.01); *G06F 1/3209* (2013.01); *G06F 1/3215* (2013.01); *G06F 3/013* (2013.01); *G06F 3/017* (2013.01); *Y02B 60/1289* (2013.01)

(58) Field of Classification Search
CPC ........ G06F 1/3231; G06F 3/013; G06F 3/017; G06F 21/32
USPC ................................ 713/300, 320, 323, 330
See application file for complete search history.

(56) References Cited

U.S. PATENT DOCUMENTS

| | | | |
|---|---|---|---|
| 6,549,650 B1 | 4/2003 | Ishikawa et al. | |
| 8,235,529 B1 | 8/2012 | Raffle et al. | |
| 2004/0196433 A1 | 10/2004 | Durnell | |
| 2005/0199783 A1 | 9/2005 | Wenstrand et al. | |
| 2010/0079508 A1* | 4/2010 | Hodge | G06F 3/013 345/697 |
| 2013/0135204 A1 | 5/2013 | Raffle et al. | |

FOREIGN PATENT DOCUMENTS

| | | |
|---|---|---|
| EP | 2587341 A1 | 5/2013 |
| JP | 2005-500630 A | 1/2005 |
| WO | 2013/089693 A1 | 6/2013 |

* cited by examiner

*Primary Examiner* — Michael J Brown
(74) *Attorney, Agent, or Firm* — Jefferson IP Law, LLP

(57) ABSTRACT

A mode switching method and apparatus of a terminal including a camera for acquiring motion information of a user and a plurality of operation modes for power management is provided. The mode switching method includes transitioning, when a motion of a first pattern is detected by the camera, the terminal from an active mode to a standby mode, transitioning, when a motion of a second pattern is detected by the camera, the terminal from the standby mode to an inactive mode, and transitioning, when a first mode switching input is detected in the inactive mode, from the inactive mode to the active mode, wherein the camera acquires the motion information of the user in at least one of the active mode and the standby mode.

22 Claims, 15 Drawing Sheets

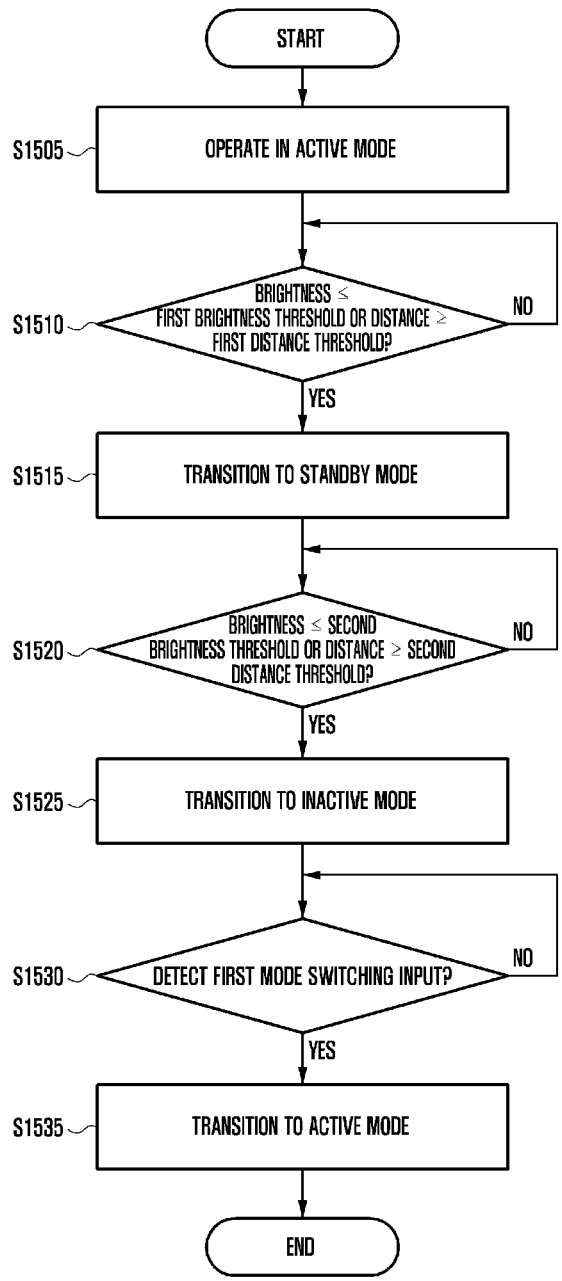

MODE SWITCHING METHOD AND APPARATUS OF TERMINAL

CROSS-REFERENCE TO RELATED APPLICATION(S)

This application claims the benefit under 35 U.S.C. §119 (e) of a U.S. Provisional application filed on Aug. 23, 2013 in the U.S. Patent and Trademark Office and assigned Ser. No. 61/869,247, and under 35 U.S.C. §119(a) of a Korean patent application filed on Aug. 11, 2014 in the Korean Intellectual Property Office and assigned Serial number 10-2014-0103785, the entire disclosure of each of which is hereby incorporated by reference.

TECHNICAL FIELD

The present disclosure relates to a mode switching method and an apparatus of a terminal. More particularly, the present disclosure relates to a method and apparatus for switching among a plurality of operation modes for power management of a terminal equipped with a camera for acquiring motion information of a user.

BACKGROUND

Typically, a terminal is provided with a plurality of operation modes for the purpose of reducing power consumption. For example, the terminal supports two operation modes, i.e. active mode and sleep mode, such that a user can switch between the two operations modes through key manipulation.

Along with the popularization of camera-equipped terminals, various camera-captured image utilization functions are integrated into the terminals. The eye-tracking function is an exemplary camera-captured image utilization function which is capable of manipulating a cursor using motion, e.g. angle information, of a pupil of a user's eye.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an eye tracking-based mode switching method of a terminal that is capable of switching the operation mode of the terminal between the sleep and active modes depending on whether the eye tracking function-related device (e.g. camera) is in inactive state or active state.

In accordance with an aspect of the present disclosure, a mode switching method of a terminal including a camera for acquiring motion information of a user and a plurality of operation modes for power management is provided. The mode switching method includes transitioning, when a motion of a first pattern is detected by the camera, the terminal from an active mode to a standby mode, transitioning, when a motion of a second pattern is detected by the camera, the terminal from the standby mode to an inactive mode, and transitioning, when a first mode switching input is detected in the inactive mode, from the inactive mode to the active mode, wherein the camera acquires the motion information of the user in at least one of the active mode and the standby mode.

In accordance with another aspect of the present disclosure, a terminal having a plurality of operation modes for power management is provided. The terminal includes a camera configured to acquire motion information of a user, an input unit configured to receive a user input, and a control unit configured to control transitioning, when a motion of a first pattern is detected by the camera, the terminal from an active mode to a standby mode, to control transitioning, when a motion of a second pattern is detected by the camera, the terminal from the standby mode to an inactive mode, and to control transitioning, when a first mode switching input is detected in the inactive mode, from the inactive mode to the active mode, wherein the camera acquires the motion information of the user in at least one of the active mode and the standby mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 is a flowchart illustrating a mode switching procedure of a terminal having a plurality of operation modes for power management according to another embodiment of the present disclosure.

Throughout the drawings, it should be noted that like reference numbers are used to depict the same or similar elements, features, and structures.

DETAILED DESCRIPTION

Figure 1:
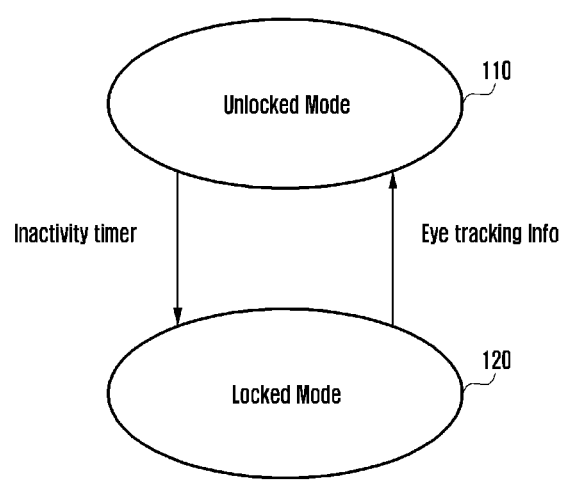
FIG. 1 is a diagram illustrating state transition of a wearable device based on eye tracking information according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof. As used herein, the singular forms "a", "an" and "the" are intended to include the plural forms as well, unless the context clearly indicates otherwise. For example, "a terminal" may indicate one terminal or include two or more terminals. As used herein, the suffix "module" is granted or used interchangeably with "unit" in consideration of easiness of description but, by itself, having no distinct meaning or role. As used herein, terms such as "first," "second," "third," etc. are used to distinguish among similar components but may not intend any sequential or temporal order.

In the specification and claims, the term "terminal" denotes a device equipped with a camera. In the specification and claims, examples of terminal include an IP (Internet Protocol) Multimedia Subsystem (IMS) terminal, a tablet Personal Computer (PC), a Portable Multimedia Player (PMP), a Personal Digital Assistant (PDA), a smartphone, a mobile phone, a digital frame, etc.

Various embodiments of the present disclosure are described hereinafter in detail with reference to the accompanying drawings. Detailed description of well-known functions and structures incorporated herein may be omitted to avoid obscuring the subject matter of the present disclosure. The subject matter of the present disclosure is not limited to the embodiments disclosed herein but may include shape modifications and supplementary functions of the elements. In the drawings, certain elements may be exaggerated or omitted or schematically depicted for clarity of the disclosure, and the actual sizes of the elements are not reflected.

FIG. 1 is a diagram illustrating state transition of a wearable device based on eye tracking information according to an embodiment of the present disclosure.

Referring to FIG. 1, an unlocked mode 110 is a state where any user activity occurs. If there is no user input during a predetermined period of time, i.e. before an inactivity timer expires, a device enters a locked mode 120. In the locked mode 120, the device, such as a display, enters a low power mode and waits for a user input. In the case of a normal wireless terminal or computer, the transition from the locked mode 120 to the unlocked mode 110 may be triggered by a key input. In FIG. 1, the transition from the locked mode 120 to the unlocked mode 110 is triggered by the supply of activity information using eye tracking information without necessity of a user's hand manipulation. That is, the device displays a predetermined pattern on the display continuously for eye tracking, determines whether the user's eyes are tracking the pattern, and, if so, transitioning from the locked mode 120 to the unlocked mode 110. This technology can be applied effectively to a wearable device, such as Head Mounted Device (MTD), restricted in and/or with respect to key inputs.

Figure 2:
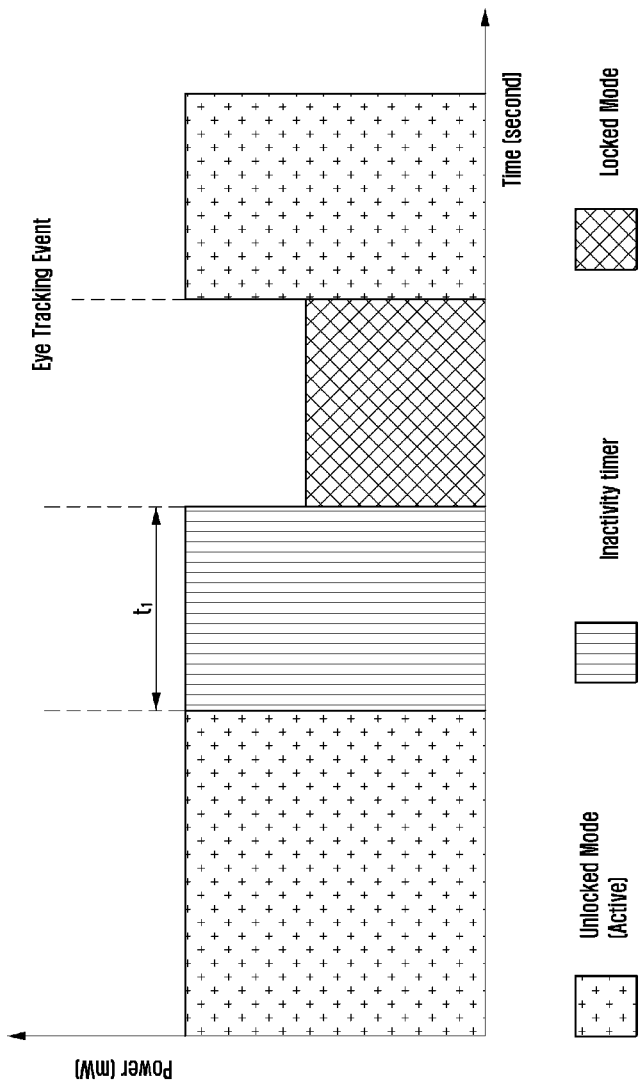
FIG. 2 is a graph illustrating power consumption of a wearable device which switches between two operation modes as shown in FIG. 1 according to an embodiment of the present disclosure.

FIG. 2 is a graph illustrating power consumption of a wearable device which switches between two operation modes as shown in FIG. 1 according to an embodiment of the present disclosure.

If there is no user input before expiry of an inactivity timer $t_1$ in the unlocked mode, the wearable device enters the locked mode. In the locked mode, the wearable device operates at a low power level such that only the eye tracking device is running, thereby reducing power consumption as compared to the unlocked mode. In this case, the locked mode can be understood in the same meaning as the sleep mode.

Figure 3:
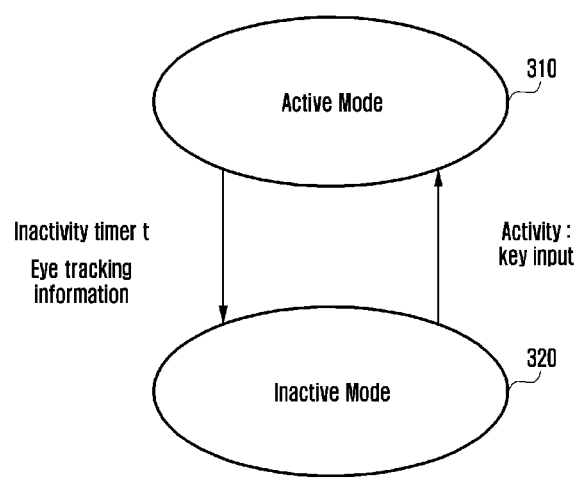
FIG. 3 is a diagram illustrating state transition of a terminal based on eye tracking technology for implementing low power operation according to an embodiment of the present disclosure.

FIG. 3 is a diagram illustrating state transition of a terminal based on an eye tracking technology for implementing low power operation according to an embodiment of the present disclosure.

It is possible to control the terminal based on a user activity estimated using the eye tracking information as well as physical contact, such as key input through a user interface. An active mode 310 is the state where the user activity occurs continuously. An inactive mode 320 is a low power mode in which a state transition to the active mode 310 is triggered by a key input through the user interface.

Figure 4:
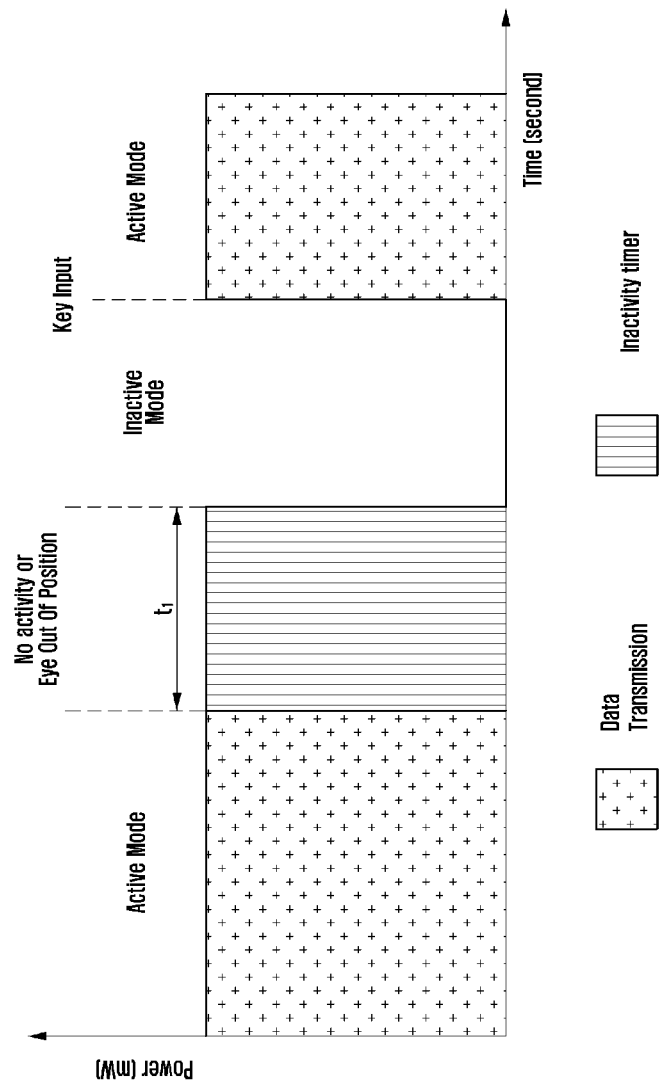
FIG. 4 is a graph illustrating power consumption of a terminal which switches between two operation modes as shown in FIG. 3 according to an embodiment of the present disclosure.

FIG. 4 is a graph illustrating power consumption of a terminal which switches between two operation modes as shown in FIG. 3 according to an embodiment of the present disclosure.

If no user activity is observed in the eye tracking information or on the user interface before the expiry of the inactivity timer $t_1$ in the active mode, the terminal enters the inactive mode and suspends a related function to achieve low power consumption. Accordingly, the power consumption of the terminal in the inactive mode drops as compared to the active mode. Although FIG. 4 is directed to a case where the power consumption of the terminal is 0 mW in the inactive mode, non-zero power may be consumed. The user may switch the operation mode of the terminal from the inactive mode to the active mode by making a contact-based input through a user interface, e.g. a key input.

Figure 5:
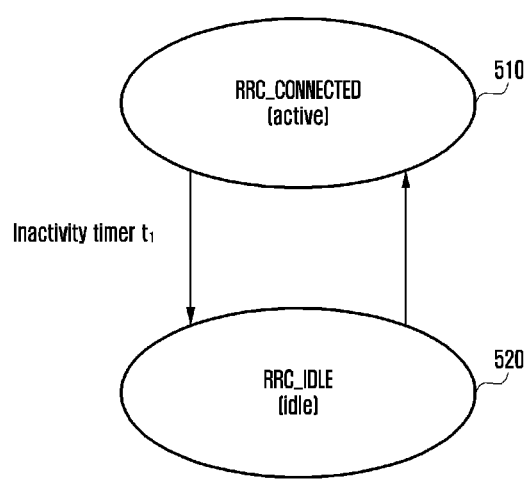
FIG. 5 is a diagram illustrating state transition of a modem of a terminal for receiving a paging signal in a wireless communication system according to an embodiment of the present disclosure.

FIG. 5 is a diagram illustrating state transition of a modem of a terminal for receiving a paging signal in a wireless communication system according to an embodiment of the present disclosure.

Referring to FIG. 5, an RRC_CONNECTED state 510 is a state where the terminal communicates with a base station without delay, and an RRC_IDLE state 520 is the state where a communication resource between the terminal and the base station is released such that delay occurs in resuming the communication. If no data activity is observed before the expiry of the inactivity timer $t_1$ in monitoring the data activity between the terminal and the base station, the terminal transitions from the RRC_CONNECTED state 510 to the RRC_IDLE state 520 to suspend the related function. The terminal should receive a paging signal from the network for communication with the base station, and the base station transmits the paging signal to the terminal at a predetermined time point. The terminal transitions from the idle mode to the active mode periodically to receive a signal. The terminal demodulates the received signal and, if the paging signal is demodulated successfully from the received signal, transitions to the RRC_CONNECTED state 510 to resume the communication.

Figure 6:
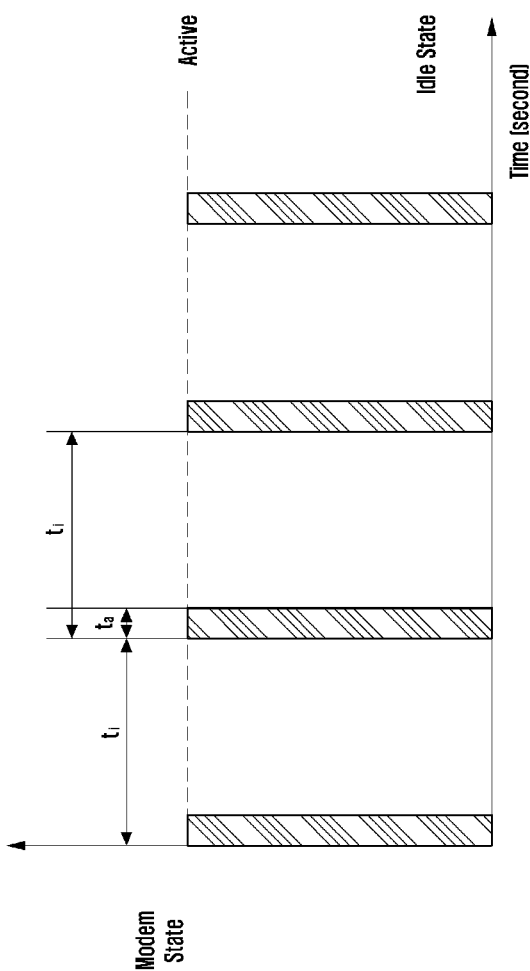
FIG. 6 is a graph illustrating a power consumption pattern of a modem of a terminal which switches between two operation states as shown in FIG. 5 according to an embodiment of the present disclosure.

FIG. 6 is a graph illustrating a power consumption pattern of a modem of a terminal which switches between two operation states as shown in FIG. 5 according to an embodiment of the present disclosure.

Here, the paging interval $t_1$ may be determined based on a network parameter. An active time $t_a$ denotes a time interval during which, after waking up to receive the paging signal, the terminal stays in the active state for demodulating the received signal and other processes and operations. By minimizing the active time $t_a$ for receiving the paging signal or by increasing the paging interval it is possible to increase the standby time of the terminal FIGS. 7 and 8 are diagrams illustrating configurations of a terminal supporting a plurality of operation modes for power management according to an embodiment of the present disclosure.

Figure 7:
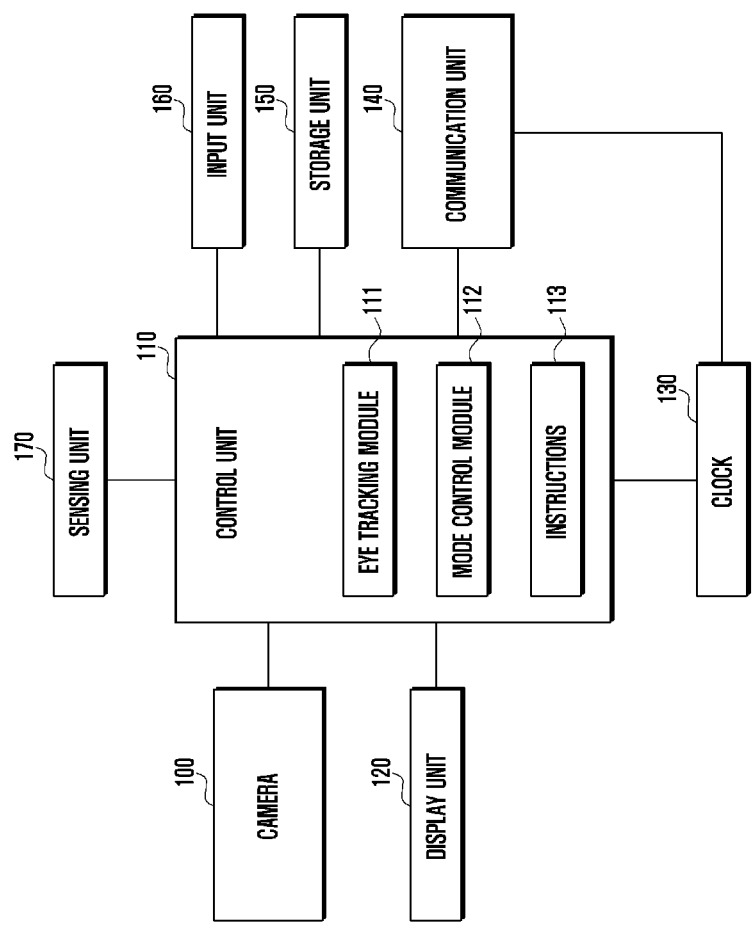
FIGS. 7 and 8 are diagrams illustrating configurations of a terminal supporting a plurality of operation modes for power management according to an embodiment of the present disclosure.
Figure 8:
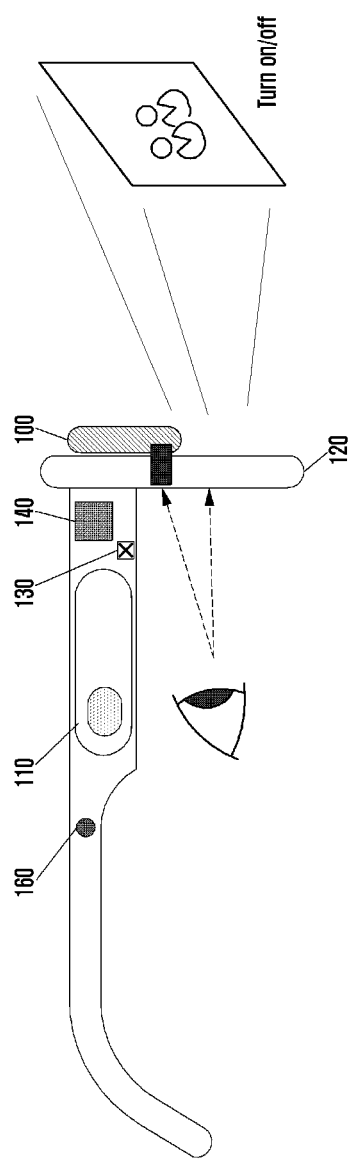

Referring to FIG. 7, the terminal includes a camera 100, a control unit 110, a display unit 120, a clock 130, a communication unit 140, a storage unit 150, an input unit 160, and a sensing unit 170.

The camera 100 detects and acquires image information. As shown in FIG. 8, the camera 100 may be a rear view camera of a terminal having a glasses function. The camera 100 may be a camera facing in the same direction as the surface of the display unit of a smartphone. The camera 100 may acquire the information on the motion of the user and sends the information to the control unit 110 periodically. The motion of the user may include the motion of the pupils of the user's eyes and the information on the motion of the user may include information on the motion of the pupils of the user's eyes. According to an embodiment of the present disclosure, the camera 100 may be configured to acquire the information on the motion of the user only in the active mode or standby mode, however, the present disclosure is not limited thereto.

The control unit 110 may include an eye tracking module 111 for tracking change of an angle of a sight line of the user based on positions of the pupils of the user's eyes, a mode control module 112 for controlling the operation mode of the terminal based on the eye tracking information, and instructions 113 for performing the function requested by the user. The control unit 110 may determine whether the detected user's motion matches a first motion pattern, a second motion pattern, or a third motion pattern. The first to third motion patterns may be configured to be identical with or different from each other and each pattern may include at least one motion of the pupils. The control unit 110 performs monitoring at a predetermined time point at an interval of the clock 130 to reduce power consumption.

The display unit 120 may be implemented with one of a Liquid Crystal Display (LCD), a Light Emitting Diode (LED) display, and an Organic LED (OLED) display, or any other similar and/or suitable type of display.

Referring to FIG. 8, the display unit 120 may be a lens of the terminal having the glasses function.

The interval of the clock 130 may be adjusted arbitrarily and, if the communication unit 140 supports a cellular communication function such as Long Term Evolution (LTE), may be used as a wakeup interval of a modem (not shown) for receiving the paging signal so as to reduce power consumption.

The communication unit 140 is responsible for communication of the terminal with an external device. The communication unit 140 may include a wireless communication interface or modem. The communication unit 140 is connected to the clock 130 to align the wakeup interval for receiving the paging signal.

The storage unit 150 stores an eye tracking algorithm and records the information on the angle of the sight line at a previous time point for use in operation mode control. The storage unit 150 may store application programs associated with the functions of the terminal and data occurring in the course of function execution of the terminal.

The input unit 160 generates and provides a signal to the control unit 110 in response to a user input made in association with function control and configuration of the terminal. The input unit 160 may be implemented with a touchscreen or a normal keypad. The input unit 160 may be understood in the same meaning as a user interface, or in other words, the input unit 160 may be implemented as a user interface. The input unit 160 may include a plurality of function keys and soft keys for use in execution of various functions. The input unit 160 receives the user's input, such as a contact input and/or a touch input, for transitioning between the active and inactive states. As shown in FIG. 8, the input unit 160 may correspond to at least one button of the terminal structured in the form of glasses. The input unit 160 may detect a first mode switching input requesting for transition from the inactive mode to the active mode and a second mode switching input requesting for transition from the active mode to the inactive mode. The input unit 160 may detect an inactive mode disable input requesting for blocking transition to the inactive mode. The input unit 160 may detect a voice input made by the user or an environmental sound input.

The sensing unit 170 may include various sensors capable of sensing user's environment. Examples of the sensors include a geomagnetic sensor, a temperature sensor, a pressure sensor, a proximity sensor, a luminance sensor, a Global Positioning System (GPS) receiver, an acceleration sensor, an angular rate sensor, a velocity sensor, a gravity sensor, a tilt sensor, a gyro sensor, and a distance sensor. The sensing unit 170 may measure an ambient brightness of the terminal or a distance from the user to the terminal.

The terminal may be configured to transition among the active mode, in which the display unit 120, the input unit 160, and the sensing unit 170 operate continuously, the standby mode, in which the display unit 120, the input unit 160, and the sensing unit 170 operate limitedly, and the inactive mode, in which only the display unit 120 or the input unit 160 operates.

Although the camera 100, the control unit 110, the display unit 120, the clock 130, the communication unit 140, the storage unit 150, the input unit 160, and the sensing unit 170 are depicted as separate blocks in charge of different functions in FIG. 7 for the convenience of description, the present disclosure is not limited thereto.

For example, if the camera 100 detects a motion of the first pattern in the active mode, the control unit 110 transitions the operation state of the terminal to the standby mode; if the camera 100 detects a motion of the second pattern in the standby mode, the control unit 110 transitions the operation state of the terminal to the inactive mode; and if the camera 100 detects a first mode switching input made through the input unit 160 in the inactive mode, the control unit 110 transitions the operation state of the terminal to the active mode. If the camera 100 detects a motion of the third pattern or a second mode switching input made through the input unit 160 in the standby mode, the control unit 110 transitions the operation state of the terminal to the active mode. The motion of each of the first to third patterns may include at least one patterned motion of pupils. The camera 100 may be configured such that its resolution in the standby mode is lower than that in the active mode.

Also, if no input is detected before the expiry of the first timer in the active mode, the control unit 110 may transition the operation state of the terminal to the standby mode and then, if no user input is detected before the expiry of the second timer in the standby mode, to the inactive mode. If a first mode switching input, made through the input unit 160, is detected in the standby mode, after the detection of the inactive mode disable input, the control unit 110 transitions the operation state of the terminal to the active mode to block transitioning to the inactive mode without detection of the user input, the camera detects the motion of the second pattern or the second timer expires.

Also, if the brightness measured by the sensing unit 170 in the active mode is equal to or less than a first brightness threshold value, the control unit 110 may transition the operation state of the terminal to the standby mode and then, if the brightness measured by the sensing unit 170 in the standby mode is equal to or less than a second brightness threshold value, the control unit 110 may transition the operation state of the terminal to the inactive mode. If the distance measured by the sensing unit 170 in the active mode is equal to or greater than a first distance threshold value, the control unit 110 may transition the operation state of the terminal to the standby mode and then, if the distance measured by the sensing unit 170 in the standby mode is equal to or greater than a second distance threshold value, the control unit 110 may transition the operation state of the terminal to the inactive mode. Although the description is directed to the mode switching based on the function of the sensing unit 170, the input unit 160 can be used in addition to or instead of the sensing unit 170.

FIG. 8 shows the terminal embodied in the form of glasses. In FIG. 8, the lens works as a display including the display unit 120 and has a rearview camera, such as the camera 100. The rearview camera may collect the information for eye tracking. In FIG. 8, the control unit 110, the clock 130, the communication unit 140, and the input unit 160 are mounted on the frame of the glasses.

Figure 9:
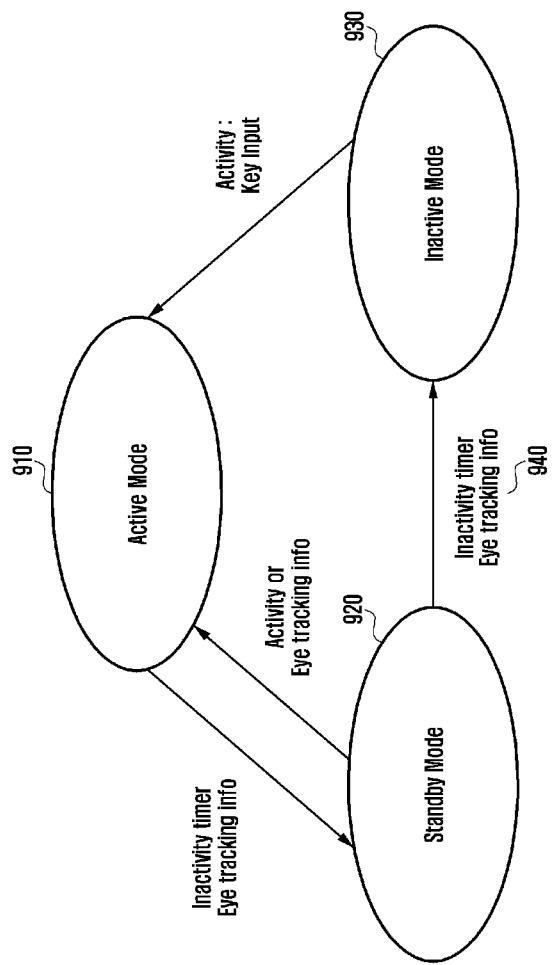
FIG. 9 is a diagram illustrating state transition of a terminal having a plurality of operations modes for power management according to an embodiment of the present disclosure.

FIG. 9 is a diagram illustrating state transition of a terminal having a plurality of operations modes for power management according to an embodiment of the present disclosure.

Referring to FIG. 9, the operation modes of the terminal include an active mode 910, a standby mode 920, and an inactive mode 930. The active mode 910 denotes the operation state in which the user activity occurs continuously, and the standby mode 920 and the inactive mode 930 are low power modes. In the standby mode 920, the terminal is deactivated with the exception of some functions, such as the user interface for eye tracking and the sensing unit. In the inactive mode 930, the terminal may transition to the active mode 910 in response to a key input made through a user interface, such as a touch screen and/or a button. The key input triggering the transition from the inactive mode 930 to the active mode 910 may be referred to as first mode switching input. The transition between the active mode 910 and the standby mode 920 may be trigged based on the eye tracking information.

In the standby mode 920, it is possible to reduce the power consumption of the terminal by adjusting the camera resolution to a value capable of performing at least the eye tracking. That is, a camera resolution optimized for eye tracking is used in the standby mode instead of a high resolution. For example, if the camera resolution of the terminal in the active mode 910 is 8 million (8M) pixels, i.e. 8 megapixels, it may be reduced to 1M pixels, which are enough for eye tracking in the standby mode 920. This concept is applicable to the case of using the context information acquired by means of the sensing unit for mode switching in such a way of reducing the sensitivity of the sensing unit to reduce the power consumption.

If no user activity is detected within a predetermined time, i.e., during an inactivity timer that provides inactivity timer eye tacking information 940, or if a motion of a predetermined pattern is detected based on the eye tracking in the standby mode 920, the terminal transitions to the inactive mode 930 to disable the tracking device, such as the camera, resulting in power consumption. The transition from the inactive mode 930 to the active mode 910 may be triggered based on any contact input such as a key stroke on the user interface.

Also, it is possible to disable the inactivity timer as one of the conditions for transitioning from the standby mode 920 to the inactive mode 930 such that the terminal transitions between the standby mode 920 and the active mode 910 without transition to the inactive mode 930. In this case, it is possible to control the mode switching of the terminal just based on the eye tracking function.

Figure 10:
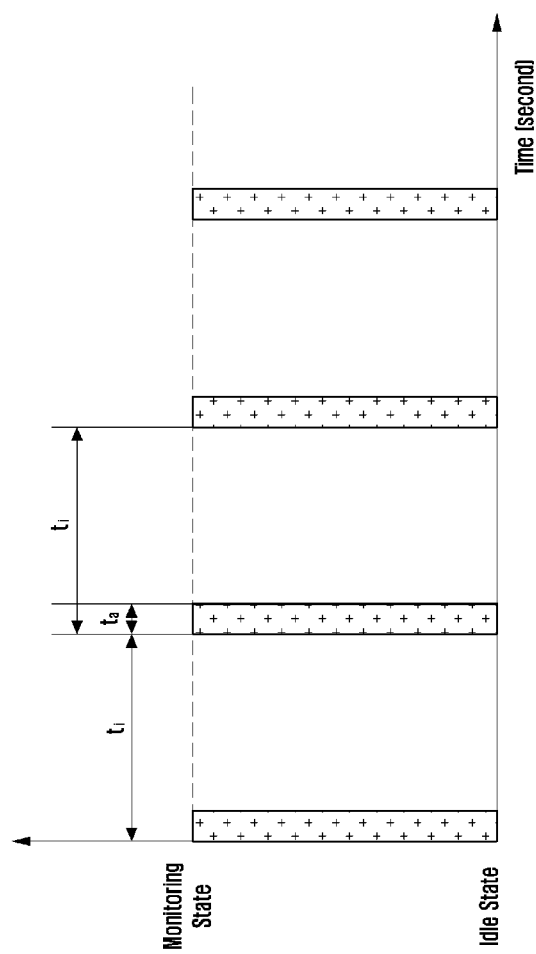
FIG. 10 is a graph illustrating power consumption of a user interface of a terminal in a standby mode according to an embodiment of the present disclosure.

FIG. 10 is a graph illustrating power consumption of a user interface of a terminal in a standby mode according to an embodiment of the present disclosure.

It is possible to reduce power consumption in such a way of performing the monitoring operation during the predetermined time period $t_a$, and then turning of the related function blocks in the standby mode. The monitoring operation may be performed at an interval $t_i$, which may be set by the user. The terminal stays in the idle state with the exception of period $t_a$ in the standby mode, and turns of, i.e., disables, the functions blocks related to the monitoring operation in the idle state. The terminal may activate a low power low frequency clock for wakeup in the standby mode periodically or at a time point set by the user. In the standby mode, the terminal stays in the monitoring state during the time period $t_a$ to enable the monitoring function block, e.g. the camera and the sensing unit, to acquire eye tracking information and/or context information for use in determining transition to the active mode.

Figure 11:
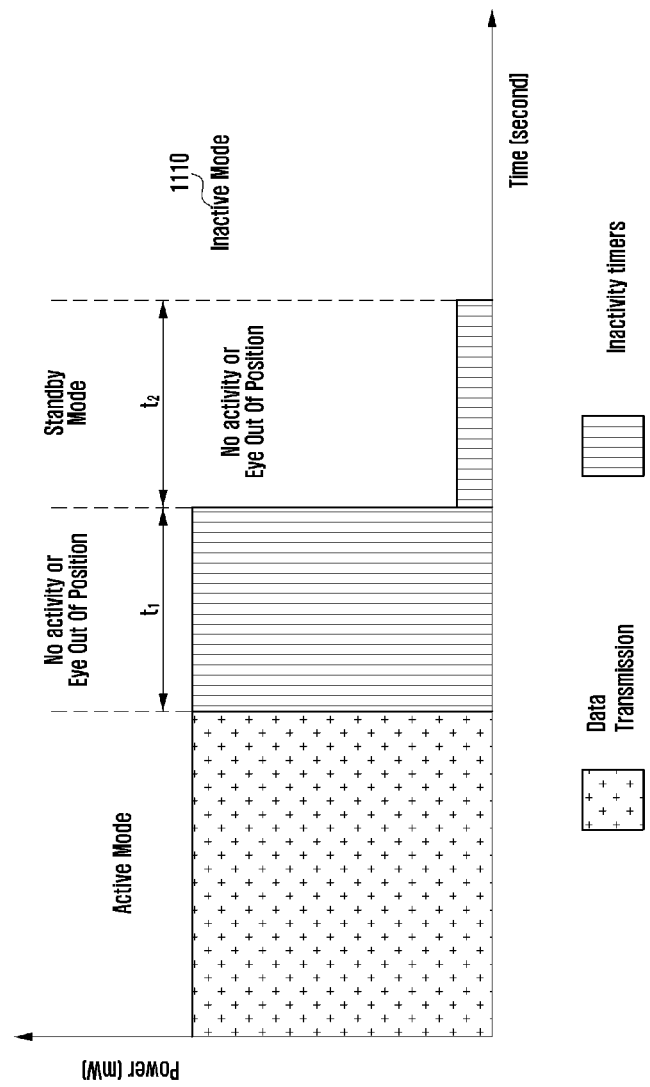
FIGS. 11 and 12 are graphs illustrating power consumptions in association with mode switching of a terminal according to an embodiment of the present disclosure.
Figure 12:
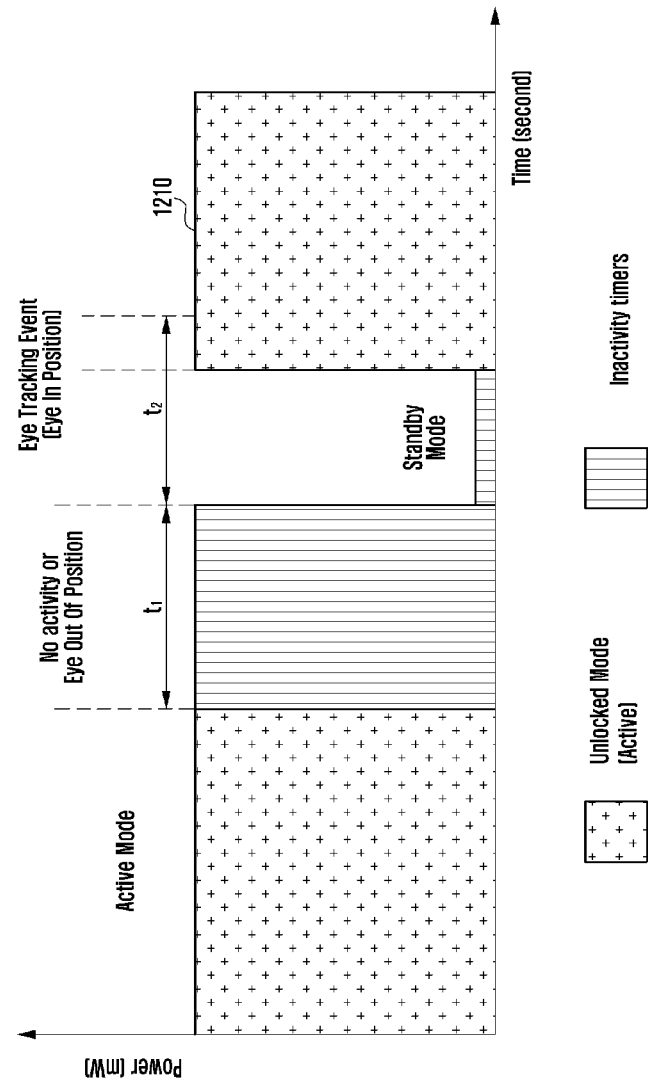

FIGS. 11 and 12 are graphs illustrating power consumptions in association with mode switching of a terminal according to an embodiment of the present disclosure.

If no user activity is detected during a time period $t_1$ in the active mode, the terminal transitions to the standby mode. In the standby mode, the terminal may monitor the user activity using the eye tracking function and the sensing unit periodically, as shown in FIG. 10. If no user activity is detected or if an eye tracking event is not detected during the time period $t_2$, for example, the user's eye is out of position, the terminal transitions to the inactive mode, as denoted by reference number 1110 of FIG. 11. In the inactive mode, the monitoring function block is turned off, i.e., disabled. If the eye tracking event is detected before the expiry of the inactivity timer $t_2$ in the standby mode, the terminal transitions back to the active mode, as denoted by reference number 1210 of FIG. 12.

FIGS. 13A and 13B are graphs illustrating synchronization of a paging signal reception and eye tracking detection according to an embodiment of the present disclosure.

The terminal may control the states of the wireless communication modem and the eye tracking devices, i.e., the user interface and the camera, independently. As shown in FIG. 13A, the modem in the idle state may wake up to enter the active state for receiving the paging signal periodically. As shown in FIG. 13B, the eye tracking devices in the idle state may wake up to the monitoring state for monitoring for the purpose of performing the eye tracking periodically. By synchronizing the wakeup operation of the modem and the wakeup operation of the eye tracking devices, it is possible to reduce the power consumption of the terminal, or in other words, it is possible to synchronize the sleep mode control and the standby mode control of the eye tracking devices.

In the case of the modem, the wakeup interval is defined by a standard. Accordingly, by synchronizing the eye tracking monitoring in the standby mode to the wakeup timing, it is possible to remove and/or reduce unnecessary electric current consumption.

Figure 13:
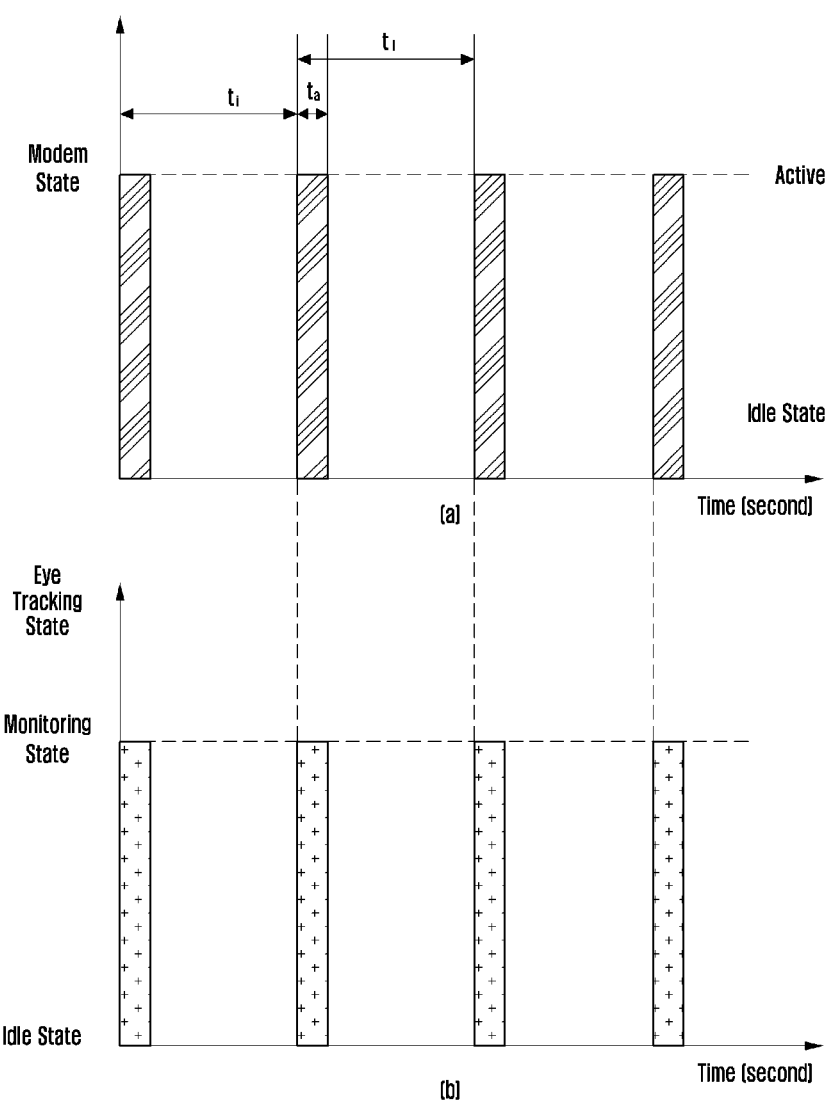
FIGS. 13A and 13B are graphs illustrating synchronization of a paging signal reception and eye tracking detection according to an embodiment of the present disclosure.

Referring to FIG. 13, the monitoring activation timing is aligned with the wakeup interval of the modem.

Figure 14:
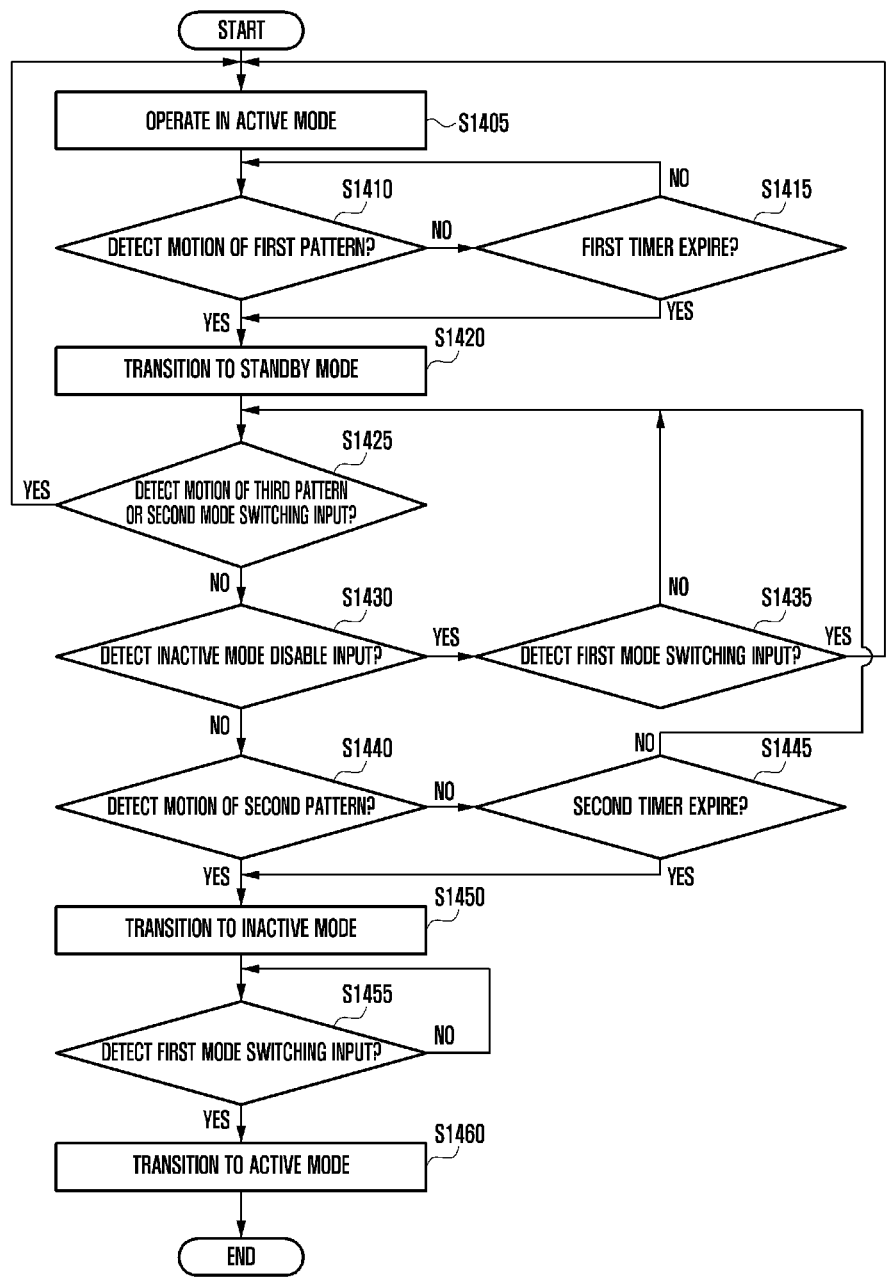
FIG. 14 is a flowchart illustrating a mode switching procedure of a terminal having a plurality of operation modes for power management according to an embodiment of the present disclosure.

FIG. 14 is a flowchart illustrating a mode switching procedure of a terminal having a plurality of operation modes for power management according to an embodiment of the present disclosure.

The terminal operates in the active mode at operation S1405. In the active mode, the camera of the terminal may continuously acquire the motion information of the user. In the active mode, the camera may determine whether a motion of a first pattern is detected at operation S1410. The motion of the first pattern may be preset by the user and may include a motion of the user's arms, motion of the user's legs, and/or motion of pupils of the user's eyes. If no motion of the first pattern is detected by the camera, in operation S1410, the terminal may determines whether a first timer expires, without detection of any user input made through the input unit, at operation S1415. The first timer may be set by the user to a value, e.g. 3 minutes. Before the expiry of the first timer, without detection any user input, the terminal stays in the active mode.

If the first timer expires without detection of the motion of the first pattern at the camera, or any user input user input made through the input unit, the terminal transitions to the standby mode at operation S1420. In the standby mode, the camera may periodically acquire the motion information of the user.

In the standby mode, the terminal determines whether the motion of a third pattern is detected by the camera or whether the second mode switching input is made through the input unit, at operation S1425. If the motion of the third pattern is detected by the camera or if the second mode switching input is made through the input unit, the terminal transitions to the active mode and returns to the beginning of the mode switching procedure illustrated in FIG. 14.

In the standby mode, the terminal determines whether an inactive mode disable input is detected by the input unit at operation S1430. Although the flowchart of FIG. 14 is directed to a case where the terminal determines whether the inactive mode disable input is detected in the standby mode at operation 1430, the present disclosure is not limited thereto, and the present disclosure includes an embodiment wherein the terminal may determine whether the inactive mode disable input is detected in the standby mode or before transitioning to the standby mode. If the inactive mode disable input is detected, the terminal determines whether the first mode switching input is detected by the input unit at operation S1435. If the first mode switching input is detected, the terminal transitions to the active mode.

In the standby mode, the terminal determines whether the motion of a second pattern is detected by the camera at operation S1440. The motion of the second pattern may be preset by the user and may include a motion of the user's arms, motion of the user's legs, and/or motion of pupils of the user's eyes. If no motion of the second pattern is detected by the camera, the terminal determines whether the second timer expires, without detection of any user input through the input unit, at operation S1445. The second timer may be set by the user to a value, e.g. 2 minutes. Before the expiry of the second timer without detection any user input, the terminal stays in the standby mode.

If the second timer expires without detection of the motion of the second pattern by the camera or a user input by the input unit, the terminal transitions to the inactive mode at operation S1450. In the inactive mode, power is not supplied to the camera, such that the camera cannot acquire the motion information of the user.

In the inactive mode, the terminal determines whether the first mode switching input is detected by the input unit at operation S1455. Before the first mode switching input is detected, the terminal stays in the inactive mode. If the first mode switching input is detected by the input unit, the terminal transitions to the active mode at operation S1460.

FIG. 15 is a flowchart illustrating a mode switching procedure of a terminal having a plurality of operation modes for power management according to another embodiment of the present disclosure.

The terminal operates in the active mode at operation S1505. In the active mode, the sensing unit of the terminal continuously acquires the context information of the terminal. The context information may include at least one of brightness information around the terminal, a distance of the terminal from the user, and a vibration detected by the terminal. The context information is not limited to the aforementioned examples, and, for example, may further include other information acquired by the sensing unit. In the active mode, the terminal determines, via the sensing unit, whether the brightness around the terminal is equal to or less than a first brightness threshold value or whether the distance from the user to the terminal is equal to or greater than a first distance threshold value, at operation S1510. The first brightness threshold value and/or the first distance threshold value may be preset by the user. If the brightness around the terminal is greater than the first brightness threshold value and the distance from the user is less than the first distance threshold value, the terminal stays in the active mode.

If the brightness around the terminal is equal to or less than the first brightness threshold value, or if the distance from the user is equal to or greater than the first distance threshold value, the terminal transitions to the standby mode at operation S1515. In the standby mode, the terminal may periodically acquire the context information of the terminal periodically via the sensing unit.

In the standby mode, the terminal determines, via the sensing unit, whether the brightness around the terminal is equal to or less than the second brightness threshold value or whether the distance from the user to the terminal is equal to or greater than the second distance threshold value at operation S1520. The second brightness threshold value or the second distance threshold value may be preset by the user. If the brightness around the terminal is greater than the second brightness threshold value and if the distance from the user is less than the second distance threshold value, the terminal stays in the standby mode.

If the brightness around the terminal is equal to or less than the second brightness threshold value or if the distance from the user is equal to or greater than the second distance threshold, the terminal transitions to the inactive mode at operation S1525. In the inactive mode, no power is supplied to the sensing unit, such that the sensing unit cannot acquire the motion information of the terminal. In the inactive mode, the terminal acquires the context information using any function activated partially in the sensing unit for use in switching between the operation modes.

Typically, the first brightness threshold value is greater than the second brightness threshold value, and the first distance threshold value is less than the second distance threshold value. Meanwhile, the second brightness threshold value may be set to the same value as the first brightness threshold value. Also, the second distance threshold value may be set to the same value as the first distance threshold value. In this case, if the brightness around the terminal is equal to or less than the first brightness threshold value or if the distance from the user is equal to or greater than the first threshold value, the terminal transitions from the active mode to the inactive mode directly.

In the inactive mode, the terminal determines whether the first mode switching input, made through the input unit, is detected at operation S1530. Before the first mode switching input is detected, the terminal stays in the inactive mode. If the first mode switching input is detected, the terminal transitions to the active mode at operation S1535.

Although FIG. 15 is directed to a case where the mode switching is performed based on the brightness around the terminal and distance from the user as the context information of the terminal, the present disclosure is not limited thereto. For example, the present disclosure can be embodied by performing the mode switching of the terminal based on one of the brightness around the terminal and the distance from the user. Also, the present disclosure can be embodied by performing the mode switching of the terminal by further taking at least one of the eye tracking information and the timer expiry information, described with reference to FIG. 14, into consideration.

As described above, the mode switching method and apparatus of the present disclosure, for use in a terminal equipped with a camera, may improve user convenience by dividing the sleep mode into a standby mode, in which the camera can acquire information, and an inactive mode, in which the camera cannot acquire information, and by determining whether to perform eye tracking-based mode switching depending on the current operation mode.

Also, the mode switching method and apparatus of the present disclosure, for use in a terminal equipped with a sensing unit, is advantageous in terms of improving user convenience by dividing the sleep mode of the terminal into a standby mode, in which the sensing unit can acquire sensing data, and an inactive mode, in which the sensing unit cannot acquire sensing data, and by determining whether to perform sensing data-based mode switching depending on the current operation mode.

Also, the mode switching method and apparatus of the present disclosure for use in a terminal may reduce power consumption by synchronizing a wakeup period of a modem of the terminal in a standby mode with an active period of a camera or a sensing unit of the terminal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mode switching method of a terminal including a camera for acquiring motion information of a user and a plurality of operation modes for power management, the method comprising:
   transitioning, when a motion of a first pattern is detected by the camera, the terminal from an active mode to a standby mode;
   transitioning, when the terminal is in the standby mode and a motion of a second pattern is detected by the camera, the terminal from the standby mode to an inactive mode; and
   transitioning, when a first mode switching input is detected in the inactive mode, from the inactive mode to the active mode,
   wherein the camera acquires the motion information of the user in at least one of the active mode and the standby mode.

2. The method of claim 1, further comprising transitioning, when at least one of a motion of a third pattern is detected by the camera and a second mode switching input is detected in the standby mode, to the active mode.

3. The method of claim 2, further comprising monitoring, at the camera, a motion of pupils of the user's eyes, and each of the motion of the first pattern, the motion of the second pattern, and the motion of the third pattern, includes at least one pupil motion.

4. The method of claim 1,
   wherein the camera comprises a standby mode resolution and an active mode resolution, and
   wherein the standby mode resolution is lower than the active mode resolution.

5. The method of claim 1, further comprising:
   transitioning, when no user input is detected before expiry of a first timer in the active mode, from the active mode to the standby mode; and
   transitioning, when no user input is detected before expiry of a second timer in the standby mode, from the standby mode to the inactive mode.

6. The method of claim 5, further comprising:
   detecting an inactive mode disable input; and transitioning, when the first mode switching input is detected in the standby mode, from the standby mode to the active mode,
wherein the terminal stays, when at least one of the motion of the second pattern is not detected by the camera and no user input is detected before expiry of the second timer, in the standby mode.

7. The method of claim 1, wherein the camera periodically acquires the motion information of the user during at least one predetermined interval in the standby mode.

8. The method of claim 7, wherein the at least one predetermined interval is synchronized with an interval at which the terminal receives a paging signal.

9. The method of claim 1, further comprising:
measuring a brightness in a vicinity of the terminal;
transitioning, when the brightness is equal to or less than a first brightness threshold value in the active mode, from the active mode to the standby mode; and
transitioning, when the brightness is equal to or less than a second brightness threshold value in the standby mode, from the standby mode to the inactive mode,
wherein the first brightness threshold value is greater than the second brightness threshold value.

10. The method of claim 1, further comprising:
measuring a distance from the terminal to the user;
transitioning, when the distance is equal to or greater than a first distance threshold value in the active mode, from the active mode to the standby mode; and
transitioning, when the distance is equal to or greater than a second distance threshold value in the standby mode, from the standby mode to the inactive mode.

11. The method of claim 1, further comprising:
continuously acquiring context information while the terminal is in the active mode,
wherein the context information includes at least one of brightness information in a vicinity of the terminal, a distance of the terminal from the user, and a vibration detected by the terminal.

12. A terminal having a plurality of operation modes for power management, the terminal comprising:
a camera configured to acquire motion information of a user;
an input unit configured to receive a user input; and
a control unit configured to:
control transitioning, when a motion of a first pattern is detected by the camera, the terminal from an active mode to a standby mode,
control transitioning, when the terminal is in the standby mode and a motion of a second pattern is detected by the camera, the terminal from the standby mode to an inactive mode, and
control transitioning, when a first mode switching input is detected in the inactive mode, from the inactive mode to the active mode,
wherein the camera acquires the motion information of the user in at least one of the active mode and the standby mode.

13. The terminal of claim 12, wherein the control unit is further configured to control transitioning, when at least one of a motion of a third pattern is detected by the camera and a second mode switching input is detected in the standby mode, to the active mode.

14. The terminal of claim 13, wherein the camera is further configured to monitor a motion of pupils of the user's eyes, and each of the motion of the first pattern, the motion of the second pattern, and the motion of the third pattern, includes at least one pupil motion.

15. The terminal of claim 12,
wherein the camera is further configured to include a standby mode resolution and an active mode resolution, and
wherein the standby mode resolution is lower than the active mode resolution.

16. The terminal of claim 12, wherein the control unit is further configured to:
control transitioning, when no user input is detected before expiry of a first timer in the active mode, from the active mode to the standby mode, and
control transitioning, when no user input is detected before expiry of a second timer in the standby mode, from the standby mode to the inactive mode.

17. The terminal of claim 16,
wherein the control unit is further configured to:
control detecting an inactive mode disable input by the input unit, and
control transitioning, when the first mode switching input is detected in
the standby mode, from the standby mode to the active mode, and
wherein the terminal is configured to stay, when at least one of the motion of the second pattern is not detected by the camera and no user input is detected before expiry of the second timer, in the standby mode.

18. The terminal of claim 12, wherein the camera periodically acquires the motion information of the user during at least one predetermined interval in the standby mode.

19. The terminal of claim 18, wherein the at least one predetermined interval is synchronized with an interval at which the terminal receives a paging signal.

20. The terminal of claim 18, wherein the control unit is further configured to:
control measuring a brightness in a vicinity of the terminal,
control transitioning, when the brightness is equal to or less than a first brightness threshold value in the active mode, from the active mode to the standby mode, and
control transitioning, when the brightness is equal to or less than a second brightness threshold value in the standby mode, from the standby mode to the inactive mode,
wherein the first brightness threshold value is greater than the second brightness threshold value.

21. The terminal of claim 12, further comprising:
a sensing unit configured to measure a distance from the terminal to the user,
wherein the control unit is further configured to:
control measuring the distance from the terminal to the user,
control transitioning, when the distance is equal to or greater than a first distance threshold value in the active mode, from the active mode to the standby mode, and
control transitioning, when the distance is equal to or greater than a second distance threshold value in the standby mode, from the standby mode to the inactive mode.

22. The terminal of claim 21,
wherein the sensing unit is further configured to continuously acquire context information while the terminal is in the active mode, and
wherein the context information includes at least one of brightness information in a vicinity of the terminal, the distance from the terminal to the user, and a vibration detected by the terminal.

* * * * *